United States Patent
Pedemonte et al.

Patent Number: 6,143,039
Date of Patent: Nov. 7, 2000

[54] BLUE DYE MIXTURES OF FIBER-REACTIVE COPPER COMPLEX FORMAZAN DYES

[75] Inventors: Ron Pedemonte, Eppstein-Vockenhausen; Werner Russ, Flörsheim, both of Germany

[73] Assignee: Dystar Textilfarben GmbH & Co., Germany

[21] Appl. No.: 09/290,488

[22] Filed: Apr. 12, 1999

[51] Int. Cl.[7] .............................. D06P 1/384; C09B 67/24
[52] U.S. Cl. ........................ 8/549; 8/641; 8/685; 8/918; 8/546; 8/917
[58] Field of Search ................ 8/546, 549, 638, 8/641, 685

[56] References Cited

U.S. PATENT DOCUMENTS

| | | |
|---|---|---|
| 4,336,190 | 6/1982 | Schwaiger et al. . |
| 4,370,145 | 1/1983 | Schwaiger et al. . |
| 5,563,248 | 10/1996 | Helmling et al. . |
| 5,704,951 | 1/1998 | Negri et al. . |
| 5,779,739 | 7/1998 | Von Der Eltz et al. . |
| 5,810,890 | 9/1998 | Russ et al. . |

Primary Examiner—Margaret Einsmann
Attorney, Agent, or Firm—Connolly, Bove, Lodge & Hutz, LLP

[57] ABSTRACT

The present invention provides a dye mixture comprising one or more copper complex formazan dyes conforming to the formula (1)

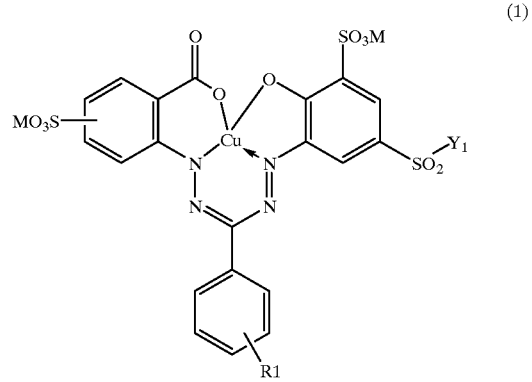

and one or more copper complex formazan dyes conforming to the formula (2)

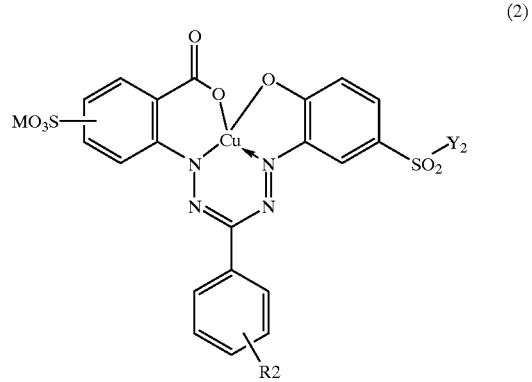

wherein R1, R2, Y1, Y2 and M are defined as given in claim 1, methods for preparing said dye mixtures and methods for dyeing and printing hydroxy- and/or carboxamido-containing materials using said dye mixtures.

6 Claims, No Drawings

BLUE DYE MIXTURES OF FIBER-REACTIVE COPPER COMPLEX FORMAZAN DYES

The present invention relates to the field of fiber-reactive dyes. It describes blue mixtures of fiber-reactive copper complex formazan dyes and use thereof for dyeing hydroxy- and/or carboxamido-contining fiber material.

Fiber-reactive copper complex formazan dyes are already known and described for example in U.S. Pat. Nos. 4,336,190 and 5,563,248. However, such dyes have some deficiencies with respect to their dyeing properties like color build-up and solubility in aqueous dyebaths in the presence of alkali and electrolyte salts. It has now surprisingly been found that mixtures of such dyes provide synergistic effects with respect to said dyeing properties.

Thus, the present invention provides a dye mixture comprising one or more copper complex formazan dyes conforming to the formula (1)

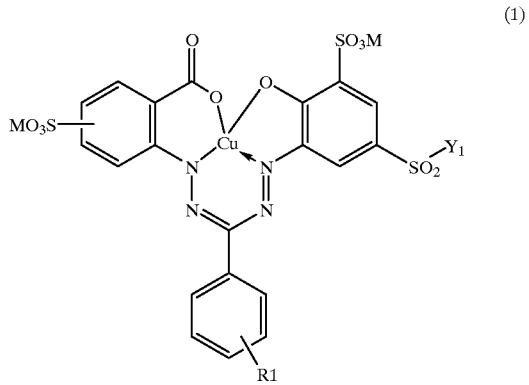

(1)

wherein $R_1$ denotes hydrogen, chloro, methoxy, methyl or sulfo;

$Y_1$ denotes vinyl or ethyl which is substituted in the β-position by a substituent which can be eliminated by the action of an alkali, forming the vinyl group; and M denotes hydrogen or an alkali metal;

and one or more copper complex formazan dyes conforming to the formula (2)

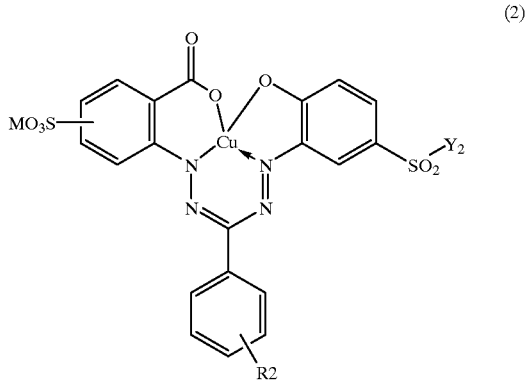

(2)

wherein $R_2$ denotes hydrogen, chloro, methoxy, methyl or sulfo;

$Y_2$ denotes vinyl or ethyl which is substituted in the β-position by a substituent which can be eliminated by the action of an alkali, forming the vinyl group; and M denotes hydrogen or an alkali metal;

Both in the formulae mentioned above and in those below the individual formula members, both with different and with the same designation within a formula, can within the scope of their definition have meanings which are the same as or different from one another.

The groups "sulfo", "thiosulfato", "carboxy", "phosphato" and "sulfato" include both the acid form and the salt form of these groups. Accordingly, sulfo groups are groups of the formula —$SO_3M$, thiosulfato groups are groups of the formula —S—$SO_3M$, carboxy groups are groups of the formula —COOM, phosphato groups are groups of the formula —$OPO_3M_2$ and sulfato groups are groups of the formula —$OSO_3M$, in which M is defined as above.

An alkali metal standing for M is, for example, lithium, sodium and potassium.

$R_1$ and $R_2$ preferably denote hydrogen.

A substituent in the β-position of ethyl standing for $Y_1$ or $Y_2$ is, for example, chlorine, thiosulfato, sulfato, phosphato, sulfobenzoyloxy, p-toluylsulfonyloxy or alkanoyloxy of 2 to 5 carbon atoms, such as acetyloxy.

$Y_1$ and $Y_2$ are each independently of one another preferably vinyl, β-chloroethyl, β-thiosulfatoethyl or β-sulfatoethyl and in particular preferably vinyl or β-sulfatoethyl.

The dyes of the formula (1), in particular if they have the same chromophore, can have, within the meaning of $Y_1$, structurally different fiber-reactive groups —$SO_2$—$Y_1$. The same is true for the dyes of the formula (2) with respect to their fiber reactive groups —$SO_2$—$Y_2$. In particular, the inventive dye mixture can contain dyes of the same chromophore conforming to the formula (1) and/or dyes of the same chromophore conforming to formula (2) in which the fiber-reactive groups —$SO_2$—$Y_1$ and —$SO_2$—$Y_2$, respectively, are partly vinylsulfonyl groups and partly β-chloroethylsulfonyl or β-thiosulfatoethylsulfonyl or preferably β-sulfatoethylsulfonyl groups. If the inventive dye mixtures contain the respective dye components in the form of a vinylsulfonyl dye, the proportion of the respective vinylsulfonyl dye to the respective β-chloro- or β-thiosulfato- or β-sulfatoethyl-sulfonyl dye will be up to about 30 mol-%, based on the respective dye chromophore.

Preference is given to inventive dye mixtures in which the proportion of vinylsulfonyl dye to the β-sulfatoethylsulfonyl dye is in terms of the molar ratio between 5:95 and 30:70.

In general, the copper complex formazan dyestuff or dyestuffs of the formula (1) and the copper complex formazan dyestuff or dyestuffs of the formula (2) are contained in the mixture in a mixing ratio of 90:10% by weight to 10:90% by weight and particularly preferable in a ratio of 75:25% to 25:75% by weight.

The inventive dye mixtures can be obtained in a conventional manner, for instance by mechanically mixing the individual dyes of formulae (1) and (2) in solid form or in form of aqueous solutions in the required proportions or by synthesis by means of the customary diazotization and coupling reactions using appropriate mixtures of the diazo and coupling components.

The individual formazan dyes of the formula (1) can be synthesized in a manner as described in U.S. Pat. No.

4,336,190 and formazan dyes of the general formula (2) can be synthesized in a manner as described in U.S. Pat. No. 5,563,248. For example, copper complex formazan compounds of formulae (1) und (2) can be prepared by dissolving the hydrazone compound of the formula (3)

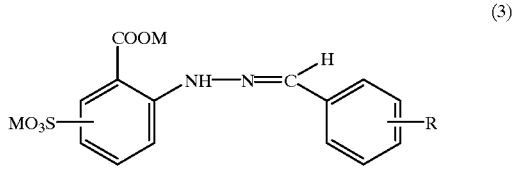
(3)

in water at a pH of 6–7. The diazonium salt solution of the amine of the formula (4)

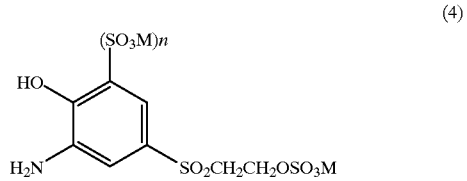
(4)

whereby n is the number 1 to prepare the copper complex formazan of formula (1) and n is the number 0 to prepare the copper complex formazan of formula (2), is added between a pH of 4–10 and at a temperature between 0 and 20° C. to the hydrazone solution. Simultaneously with the diazonium compound or together with it or after the addition of the diazonium compound, the at least equimolar amount of a copper donating agent, for example copper sulfate, is added. The metallization reaction is also carried out advantageously between pH 4–10. The metallization reaction proceeds rapidly and it has proved advantageous to acidify the reaction solution to pH 1.0 and stir for approximately 1 hour prior to isolation.

The inventive dye mixtures prepared by a chemical route can be separated out from their synthesis solution by generally known methods, thus, for example, either by precipitation from the reaction medium by means of electrolytes, such as for example, sodium chloride or potassium chloride, or by evaporation or spray-drying of the reaction solution, it being possible for a buffer substance to be added to this reaction solution.

The dye mixtures of the invention can be prepared in solid or in liquid (dissolved) form. In solid form they generally contain the electrolyte salts customary in the case of water-soluble and in particular fiber-reactive dyes, such as sodium chloride, potassium chloride and sodium sulfate, and also assistants customary in commercial dyes, such as buffer substances capable of establishing a pH in aqueous solution between 3 and 7, such as sodium acetate, sodium borate, sodium bicarbonate, sodium citrate, sodium dihydrogenphosphate and disodiumhydrogenphosphate, small amounts of siccatives or if, they are present in liquid, aqueous solution (including the presence of thickeners of the type customary in print pastes), substances which ensure the permanence of these preparations, for example mold preventatives.

In general, the dye mixtures will take the form of dye powders containing from 10 to 80% by weight, based on the dye powder or preparation, of a strength-standardizing colorless diluent electrolyte salt. These dye powders may in addition contain the abovementioned buffer substances in a total amount of up to 5% by weight, based on the dye powder. If the dye mixtures of the invention are present in aqueous solution, the total dye content of these aqueous solutions is up to about 50% by weight, for example between 5 and 50% by weight, the electrolyte salt content of these aqueous solutions preferably being below 10% by weight, based on the aqueous solution; the aqueous solutions (liquid preparations) can in general contain the abovementioned buffer substances in an amount of up to 5% by weight, preferably up to 2% by weight.

The novel dye mixtures according to the invention are surprisingly advantageous over the individual dyestuffs of formula (1) as well as (2). For example, they provide advantages in respect to color build-up and solubility in aqueous dyebaths in the presence of alkali and electrolyte salts over these individual dyes and are distinguished by a very good tinctorial strength. The color yields of the dyeings obtained with the dye mixtures are surprisingly significantly higher than the average of the sum of the color yields of the dyeings obtained with said individual dyes. The synergistic effect of the dye mixtures of the invention with regard to the individual dyestuffs of the mixture, not to be expected, means a high economical advantage in addition.

The dye mixtures according to the invention are used for dyeing (which includes printing) materials containing hydroxy and/or carboxamide groups, for example in the form of sheet-like structures, such as paper and leather, or of films, such as, for example, of polyamide, or in bulk, such as, for example, polyamide and polyurethane, but in particular these materials in fiber form. The solution of the dye mixtures according to the invention obtained during synthesis of their individual formazan dyes can also be used for dyeing directly as a liquid preparation, if appropriate after addition of a buffer substance and if appropriate also after concentration or dilution.

The present invention thus also relates to the use of the dye mixtures according to the invention for dyeing these materials and to processes for dyeing such materials by procedures which are customary per se in which a dye mixture according to the invention is employed as the coloring agent. So, the dye mixtures according to the invention are applied to and fixed on the substrates mentioned, in particular the fiber materials mentioned, by the application techniques known for water-soluble dyestuffs, in particular for fiber-reactive dyestuffs, and they are fixed on these materials in particular by the action of an alkaline reacting agent or by the action of heat or by both measures. The materials are preferably used in the form of fiber materials, in particular in the form of textile fibers, such as woven fabrics or yarns, such as in the form of hanks or wound packages.

Materials containing hydroxy groups are those of naturally occurring or synthetic origin, such as, for example, cellulose fiber materials or regenerated products thereof, and polyvinyl alcohols. Cellulose fiber materials are preferably cotton, but also other plant fibers, such as linen, hemp, jute and ramie fibers; regenerated cellulose fibers are, for example, viscose staple and filament viscose.

Materials containing carboxamide groups are, for example, synthetic and naturally occurring polyamides and polyurethanes, in particular in the form of fibers, for example wool and other animal hair, silk, leather, nylon 6,6, nylon 6, nylon 11, and nylon 4.

Dyeings with very good color yields which are improved with respect to the individual dyestuffs are those obtained with them on cellulose fibers by the exhaustion process for a long liquor ratio using the most diverse acid-binding agents and if appropriate neutral salts, such as sodium chloride or sodium sulfate. Dyeing is preferably carried out in an aqueous bath at temperatures between 40 and 105° C., if appropriate at a temperature of up to 130° C. under pressure, and if appropriate in the presence of customary dyeing auxiliaries. A procedure can be followed here in which the material is introduced into the hot bath, this is gradually heated to the desired dyeing temperature and the dyeing process is brought to completion at this temperature. If desired, the neutral salts which accelerate exhaustion of the dyestuffs can also be added to the bath only after the actual dyeing temperature has been reached.

Very good color yields and a very good color build-up are likewise obtained by the padding process on cellulose fibers, it being possible for the dyeings to be fixed in the customary manner by batching at room temperature or elevated temperature, for example up to about 60° C., by steaming or with dry heat.

Strong prints with a good contour level and a clear white background are likewise obtained by the customary printing processes for cellulose fibers, which can be carried out in one phase, for example by printing with a printing paste comprising sodium bicarbonate or another acid binding agent and subsequent steaming at 100 to 103° C., or in two phases, for example by printing with neutral or weakly acid printing ink and subsequent fixing either by passing the goods through a hot electrolyte-containing alkaline bath or by over-padding with an alkaline electrolyte-containing padding liquor and subsequent batching or steaming or dry heat treatment of the material over-padded under alkaline conditions. The printing result depends only little on the varying fixing conditions. Hot air at 120 to 200° C. is used for fixing by means of dry heat by the customary thermofixing processes. In addition to customary steam at 101 to 103° C., it is also possible to employ superheated steam and pressurized steam at temperatures of up to 160° C.

The acid-binding agents and the agents which effect fixing of the dyestuffs of the dye mixtures according to the invention to the cellulose fibers are, for example, water-soluble basic salts of the alkali metals and likewise alkaline earth metals with inorganic or organic acids, or compounds which liberate alkali under the influence of heat. The alkali metal hydroxides and alkali metal salts of weak to moderately strong inorganic or organic acids are to be mentioned in particular, the alkali metal compounds preferably meaning sodium and potassium compounds. Such acid-binding agents are, for example, sodium hydroxide, potassium hydroxide, sodium carbonate, sodium bicarbonate, potassium carbonate, sodium formate, sodium dihydrogen phosphate, disodium hydrogen phosphate, sodium trichloroacetate, water-glass or trisodium phosphate.

The dye mixtures according to the invention are distinguished by a high fixing yield when used in dyeing and printing processes on cellulose fiber materials. After customary after-treatment by rinsing to remove non-fixed portions of dyestuff, the dyeings on cellulose show excellent wet-fastnesses, especially since non-fixed portions of dyestuff can easily be washed out because of their good solubility in cold water. The dyeings and prints obtained have clear shades; in particular, the dyeings and prints on cellulose fiber materials have a good lightfastness and very good wet-fastnesses, such as fastness to washing, milling, water, seawater, cross-dyeing and acid and alkaline perspiration, and furthermore a good fastness to pleating, fastness to ironing and fastness to rubbing.

The dye mixtures according to the invention can furthermore also be used for fiber-reactive dyeing of wool. Wool which has been given an antifelting or low-felting treatment (cf., for example, H. Rath, Lehrbuch der Textilchemie (Textbook of Textile Chemistry), Springer-Verlag, 3rd edition (1972), pages 295–299, in particular treatment by the so-called Hercosett process (page 298), J. Soc. Dyers and Colourists 1972, 93–99, and 1975, 33–44) can also be dyed with very good fastness properties.

The process for dyeing wool is carried out here by the customary and known dyeing procedure from an acid medium. Thus, for example, acetic acid and/or ammonium sulfate or acetic acid and ammonium acetate or sodium acetate can be added to the dyebath in order to obtain the desired pH. To achieve a usable levelness of the dyeing, it is advisable to add customary leveling auxiliaries, such as, for example, those based on a reaction product of cyanuric chloride with 3 times the molar amount of an aminobenzensulfonic acid, or based on a reaction product of, for example, stearylamine with ethylene oxide. Thus, for example, the dye mixture according to the invention is preferably first subjected to the exhaustion process from and acid dyebath with a pH of about 3.5 to 5.5, the pH being controlled, and, towards the end of the dyeing time, the pH is shifted into the neutral and, if appropriate, weakly alkaline range up to a pH of 8.5, in order to bring about a complete reactive bond between the dyestuffs of the dye mixtures and the fiber in particular to achieve good depths of color. At the same time, the dyestuff portion which has not been bonded reactively is dissolved off.

The procedure described here also applies to the production of dyeings on fiber materials of other naturally occurring polyamides or of synthetic polyamides and polyurethane. As a rule, the material to be dyed is introduced into the bath at a temperature of about 40° C. and agitated therein for some time, the dyebath is then adjusted to the desired weakly acidic pH, preferably with acetic acid, and the actual dyeing carried out at a temperature between 60 and 98° C. The dyeings can also be carried out at the boiling point or in closed dyeing apparati at temperatures of up to 106° C. Since the water-solubility of the dye mixtures according to the invention is very good, they can also advantageously be employed in customary continuous dyeing processes.

The dye mixtures according to the invention afford clear reddish-tinged blue dyeings on the materials mentioned, preferably fiber materials.

The following Examples serve to illustrate the invention. The parts are parts by weight and the precentage data are precentages by weight, unless stated otherwise. Parts by weight bear the same relation to parts by volume as the kilogram to the liter. The compounds described by their formulae in the Examples are shown in the form of free acids; they are in general prepared and isolated in the form of their salts, in particular alkali metal salts, preferably sodium or potassium salts, and used for dyeing in the form of their salts. The starting compounds mentioned in the form of the free acid in the following examples, can likewise be employed in the synthesis as such or in the form of their salts, preferably alkali metal salts, such as sodium or potassium salts.

EXAMPLE 1

A dye mixture according to the invention is prepared by mechanically mixing 100 parts of a blue electrolyte-salt containing powder with a content of 75% of a dye of formula (1a)

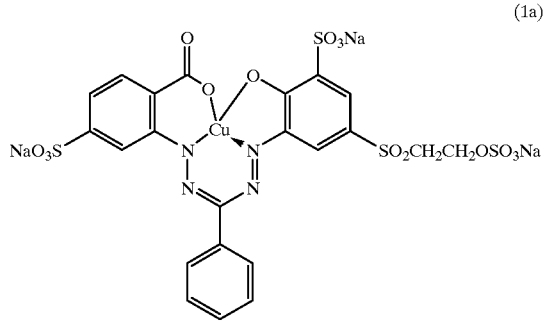

with 41.7 parts of a blue electrolyte-salt containing powder with a content of 60% of a dye of formula (2a).

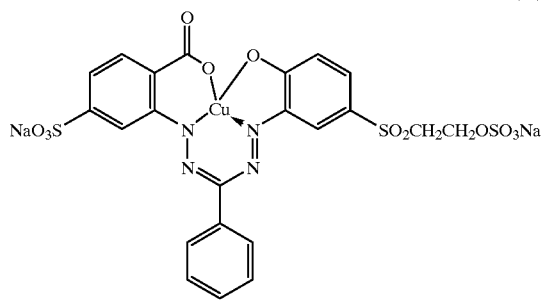

The resulting mixture contains 75% (w/w) of dye (1a) and 25% (w/w) of dye (2a) and dyes cotton in a reddish-tinged blue. The dye mixture exhibits excellent dyestuff properties (i.e. washfastness and lightfastness).

EXAMPLE 2

A dye mixture according to the invention is prepared by mechanically mixing 100 parts of a blue electrolyte-salt containing powder with a content of 75% of a dye of formula (1a) with 125 parts of a blue electrolyte-salt containing powder with a content of 60% of a dye of formula (2a). The resulting mixture contains 50% (w/w) of dye (1a) and 50% (w/w) of dye (2a) and dyes cotton in a reddish-tinged blue. The dye mixture exhibits excellent dyestuff properties (i.e. washfastness and lightfastness).

EXAMPLE 3

A dye mixture according to the invention is prepared by mechanically mixing 33.3 parts of a blue electrolyte-salt containing powder with a content of 75% of a dye of formula (1a) with 125 parts of a blue electrolyte-salt containing powder with a content of 60% of a dye of formula (2a). The resulting mixture contains 25% (w/w) of dye (1a) and 75% (w/w) of dye (2a) and dyes cotton in a reddish-tinged blue. The dye mixture exhibits excellent dyestuff properties (i.e. washfastness and lightfastness).

EXAMPLE 4

A dye mixture according to Example 1 is prepared synthetically starting with 320 parts of the hydrazone, which results by condensing 2-carboxy-phenylhydrazine-5-sulfonic acid with benzaldehyde, as described in U.S. Pat. No. 4,336,190, in 1,5 kg of water and the pH of the solution is adjusted to 6–7 with aqueous sodium hydroxide solution.

In a separate step, 282 parts of 4-β-sulfatoethyl-sulfonyl-2-aminophenol-6-sulfonic acid and 74.3 parts of 2-amino-4-(β-sulfatoethylsulfonyl)-phenol in an aqueous sulfuric acid solution are diazotized with an aqueous sodium nitrite. The resulting mixed diazo suspension is added to the above aqueous hydrazone solution and the pH is maintained between 4 and 6 with an aqueous sodium carbonate solution. When the coupling is finished, the reaction mixture is heated up to 40–80° C. at a pH of 2–5 for 5 hours. The resulting dyestuff solution is spray-dried to afford a dye mixture containing 75% of a blue dye of formula (1a) and 25% of a blue dye of formula (2a).

The dyes of the invention were evaluated by exhaust dyeing cotton test specimens. Exhaust dyeing is well known in the art. The dye mixture of Example 1 described in this invention was dyed over a set of defined concentrations versus the individual dyestuffs of the dye mixtures. The mixtures of dyes and the individual dyes were initially normalized by color strength (by use of molar extinction coefficients) to the dye represented by formula (1a). The color yield of each dyeing was evaluated by a computer assisted spectrophotometric method known in the art. The color yield is expressed in color density units (CDU's). The results of these tests are listed in Table 1.

TABLE 1

| | Color Yield in CDU's | | |
|---|---|---|---|
| % Dye | Dye of formula (1a) | Dye of formula (2a) | 75% : 25% mixture of Dyes (1a) and (2a) Example 1 |
| 0.5 | 0.245 | 0.316 | 0.294 |
| 1.0 | 0.416 | 0.534 | 0.514 |
| 2.0 | 0.777 | 0.937 | 0.962 |
| 3.0 | 1.111 | 1.313 | 1.350 |
| 4.0 | 1.376 | 1.635 | 1.744 |
| 5.0 | 1.780 | 2.168 | 2.100 |
| 6.0 | 2.064 | 2.370 | 2.542 |
| 7.0 | 2.319 | 2.680 | 2.867 |
| 8.0 | 2.621 | 2.747 | 3.105 |
| 9.0 | 2.852 | 2.802 | 3.334 |
| 10.0 | 2.957 | 2.841 | 3.489 |

The results set forth in Table 1 show that, at 5.0 to 10.0% dye concentration, the color yields of the dyestuff mixtures according to Example 1 are surprisingly significantly higher than the average of the sum of the color yields given by the individual dyestuffs of formulae (1a) and (2a).

What is claimed:

1. Dye mixture comprising one or more copper complex formazan dyes conforming to the formula (1)

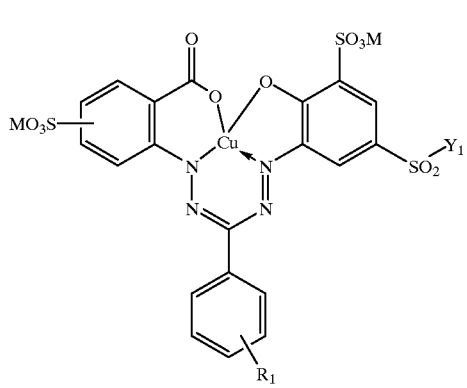

(1)

wherein $R_1$ denotes hydrogen;

$Y_1$ denotes vinyl or ethyl which is substituted in the β-position by a substituent can be eliminated by the action of an alkali, forming the vinyl group; and M denotes hydrogen or an alkali metal;

and one or more copper complex formazan dyes conforming to the formula (2)

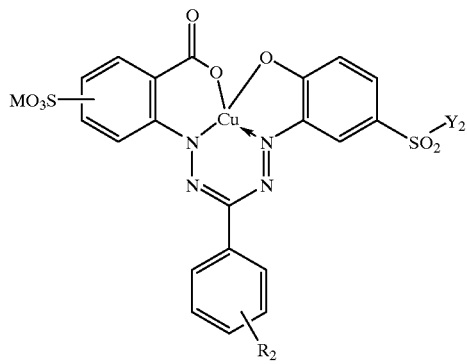

(2)

wherein $R_2$ denotes hydrogen;

$Y_2$ denotes vinyl or ethyl which is substituted in the β-position by a substituent which can be eliminated by the action of an alkali, forming the vinyl group; and M denotes hydrogen or an alkali metal.

2. The dye mixture of claim 1, comprising one or more dyestuffs of the formula (1) and one or more dyestuffs of the formula (2) in a mixing ratio of 90:10% by weight to 10:90% by weight.

3. The dye mixture of claim 1, comprising one or more dyestuffs of the formula (1) and one or more dyestuffs of the formula (2) in a mixing ratio of 75:25% by weight to 25:75% by weight.

4. A method for dyeing or printing hydroxy- and/or carboxamido-containing fiber materials comprising the step of dyeing or printing said materials with a dye mixture as claimed in claim 1.

5. The dye mixture of claim 1, wherein the $Y_1$ and $Y_2$ independently of one another are vinyl or β-sulfatoethyl.

6. A method for preparing the dye mixture of claim 1 comprising mechanically mixing the individual dyes in the required proportions or synthesizing the dye mixture by means of diazotization and coupling reactions using mixtures of the diazo and coupling components.

* * * * *